June 3, 1924.
J. S. McWHIRTER
1,496,097
CAR CONTROL DEVICE
Filed April 25, 1921
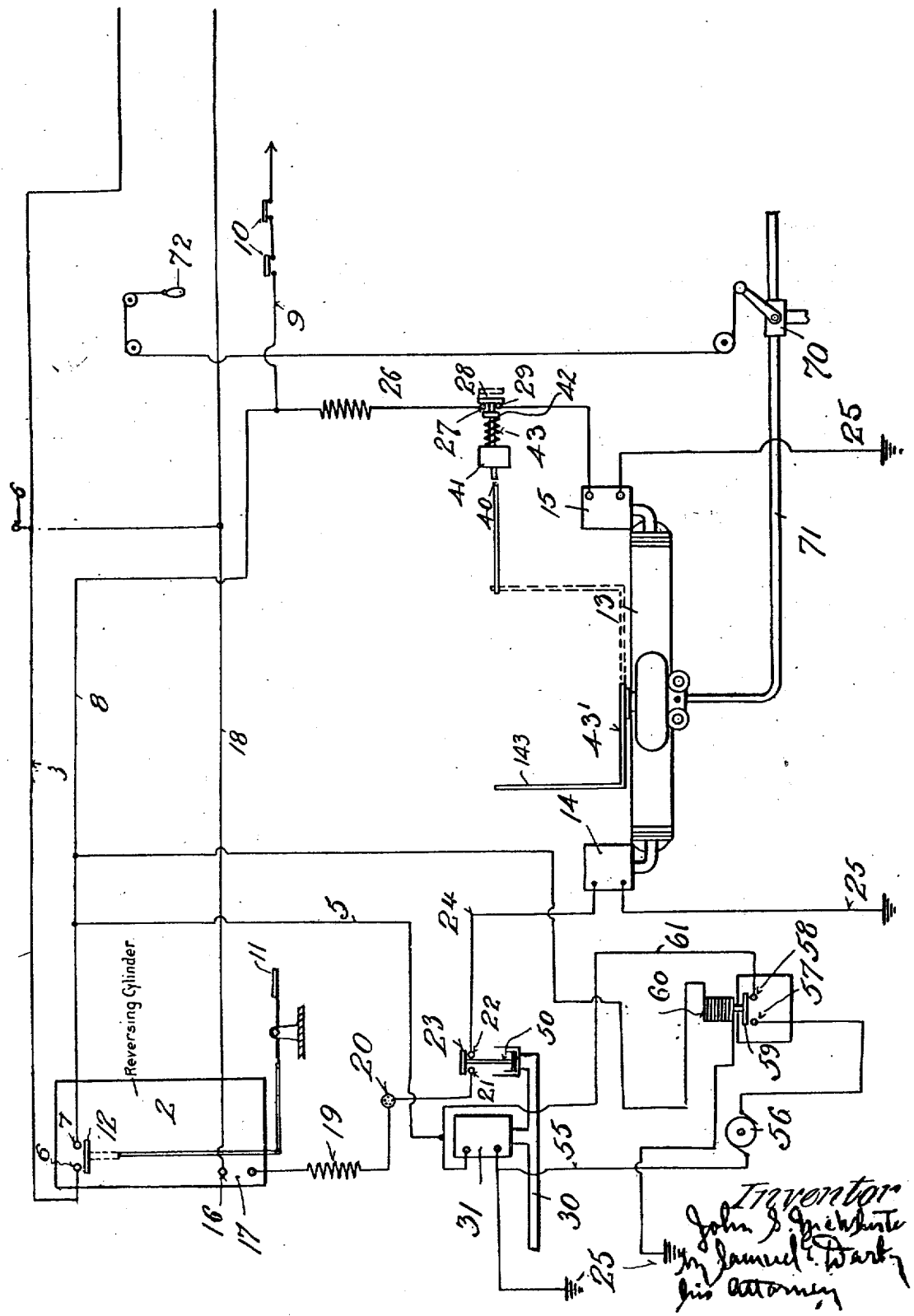

Patented June 3, 1924.

1,496,097

UNITED STATES PATENT OFFICE.

JOHN S. McWHIRTER, OF NEW YORK, N. Y., ASSIGNOR TO NATIONAL PNEUMATIC COMPANY, OF NEW YORK, N. Y., A CORPORATION OF WEST VIRGINIA.

CAR-CONTROL DEVICE.

Application filed April 25, 1921. Serial No. 464,176.

*To all whom it may concern:*

Be it known that I, JOHN S. McWHIRTER, a citizen of the United States, residing at New York, county and State of New York, have made a certain new and useful Invention in Car-Control Devices, of which the following is a specification.

This invention relates to car control devices, and particularly cars driven by electric power.

The object of the invention is to provide car control devices which are simple in structure, economical of manufacture, installation and maintenance, and exceedingly efficient in operation.

A further object of the invention is to provide means in a street or elevated car whereby the motive power, and the opening and closing movements of the doors are simultaneously controlled from a single control station.

A further object of the invention is to provide in what is known as a one man car means associated with the motive controller for controlling the opening and closing movements of the door.

A further object of the invention is to provide in a system of the character described means for preventing motive power from being supplied to the car motor when any door on the car is open and to prevent any door from being open when the power is on.

Further objects of the invention will appear more fully hereinafter.

The invention consists substantially in the construction, combination, location, and relative arrangement of parts, and circuits employed in connection therewith, all as will be hereinafter set forth, as shown by the accompanying drawings, and finally pointed out in the appended claims.

Referring to the drawing: I have shown diagrammatically an electric control-system embodying my invention.

In the present street car art the so-called one man cars are being extensively adopted because they are efficient and more economical to operate than the two man cars where both a motorman and a conductor are required. In the one man car the motorman acts as the conductor in addition to his duties in controlling the movements of the car. It has been found that the control of the movements of the car and of the car brakes can be simultaneously controlled by a foot pedal, or any other suitable single movable part, to be moved at will by the motorman, and it is known in the art to connect the actuating pedal or moving part with the brakes or the pneumatic brake valve so that when the power is on the brakes are applied, and vice versa, to provide a neutral point where the power is off but the brakes are not applied. One objection to such one man control cars is that there is not a man at each door of the car to prevent boarding and alighting accidents. For this reason the one man controlled cars have heretofore been largely constructed of the folding door type, or where some door is employed to prevent passengers from boarding or alighting from the car until the door is opened. Due to the fact that the motorman is located at the front end of the car naturally, it has been the practice in one man controlled cars to use only the front door for taking on or discharging passengers, and in this type of car pneumatic motors are practically universally used for actuating the door. My present invention has for one of its objects to provide in a system of door control means for preventing the car door from being opened at any time while the car is in motion.

In the one man control car the usual controller is not employed as the only equipment. On the car is what is termed the reversing cylinder by which the car can be made to travel forwards or backwards, the usual controller being replaced by an automatic accelerator which upon completion of its controlling circuit starts the car from standstill and increases its speed automatically from zero to maximum unless the circuit is broken. I have illustrated my invention as applied to such a system, and for the purpose of simplicity have shown the various parts diagrammatically as the same illustrates fully and clearly the principles of my invention.

Referring to the drawing: 1 designates the connection to the source of power, which may be in the form of a trolley pole, shoe, or the like. 2 represents the reversing cylinder at opposite ends of the car, and while one is located at each end of the car, for the purpose of illustration I have merely shown one, inasmuch as the circuits are the same, and they are connected in parallel so that control of the car operation may be effected from either of them. Current is fed from the connection 1 by conductor 3 to a contact 6 located on the reversing cylinder which is normally out of circuit with the contact 7, which contact communicates through connections 8 and 9 to door switches 10, etc., one door switch being provided for each door in the car and the door switch being closed only when the door is closed, the circuit terminating in ground or return connection in the usual well known manner. Also provided on the reversing cylinder 2 are normally open contacts 16 and 17. Contact 16 is in connection through conductor 18, with the source of power and the contacts are adapted to be bridged or placed in communication with each other when the reversing cylinder is in its power forward position, that is, when the control handle is thrown in its forward position so that upon actuation of other operating mechanism the car will travel forward. The circuit connection is maintained between contacts 16 and 17 as long as the controller handle for the reversing cylinder is in its forward position. A bridging contact 12 controlled by the motorman in any suitable manner, for example, by means of a fulcrum pedal 11 bridges the contacts 6 and 7 when pressure is imposed upon the pedal 11. Contact 17 is in communication through resistance 19, push button 20, to contact 21, which is adapted to be placed in electrical communication with contact 22 by bridging members 23 hereinafter to be described, and contact 22 is connected through line 24 to magnet valve 14 and ground 25. Likewise, conductor 8 connects resistance 26, contacts 27 and 29, bridging device 28 (to be more fully described hereinafter), closing magnet valve 15, to ground 25. Magnet valves 14 and 15 control a pneumatic motor 13 for actuating the door and to open and close the same in the usual well known manner, which motor is of the usual well known construction, its details of construction being so well known in the art as to require mere diagrammatic illustration, and it is sufficient to state that the motor is operated to close the door when magnet valve 15 is energized and to open the door when the magnet valve 14 is energized. The bridging device 28 consists of a plunger 40 mounted in a collar 41 to coact with a spring 43 supported against a stationary block 42 through which rod 40 slides and normally tends to keep the bridging portion 28 in contact with the contacts 27 and 29. When the door completes its closing movement, however, through energization of the magnet 15, which can be secured only when the bridging device 28 is bridging the contacts 27 and 29, any protuberance of the door or the door actuating arm 43' as member 143 engages rod 40 and consequently displaces the bridging device 28 against the action of the spring 43 to break the circuit of 8, 26, 27, 29, and 25, as will be clearly understood. For controlling the bridging device 23 I construct the bridge 23 in the form of a piston of the fluid pressure actuated type, whereby when fluid pressure is admitted through pipe line 30 behind the piston 50 of bridge 23 circuit connection is broken between 17, 19 and 21, and 22, 24, 14 and 25. To control the fluid pressure to and from the piston 50 I employ a magnet valve 31. The magnet valve can be actuated in two manners, and upon actuation thereof, the bridge 23 is out of contact with contacts 21 and 22. The actuation in one instance is secured through line 5, which is connected to line 8, and when the bridging device 12 establishes circuit connection between contacts 6 and 7 current is supplied from the connection 1, contact 6, bridge 12, contact 7, lines 8 and 5, magnet 31 and ground 25. When the magnet is energized, as above explained, fluid pressure passes through pipe line 30, behind piston 50 to break the circuit between contacts 21 and 22. As soon as the magnet 31 is deenergized the piston 50 falls by gravity to again establish circuit connection by means of bridging device 23 between contacts 21 and 22. The second means for securing the energization of the magnet valve 31 is by means of a circuit 55 passing through the car motor 56 to contacts 57 and 58, which are bridged by bridge 59, when a magnet 60, which will be described later, is deenergized, and from line 61 to the magnet valve. The magnet 60 receives current from the line 8 when the bridging device 12 is operated by the foot pedal 11, for example, thereby establishnig circuit connection between contacts 6 and 7, which current passes to ground or return 25. From the foregoing description the operation of the system will be apparent. Assume that the car is at a standstill with the bridging device 12 out of contact with the terminals 6 and 7, that is, the car accelerator is receiving no current, but the controller handle remains in its forward position, thus establishing circuit connection between contacts 16 and 17 as above described, upon closing button switch 20 and when magnet 31 is de-energized current flows from line connection 1, line 18, contacts 16 and 17, resistance 19, button switch 20, through contact 21, bridging device 23, contact 22, line 24, and opens the magnet valve 14 to current, thus energizing the door motor to open the door. The closing magnet 15 may then at any time be energized in the usual well known manner to close the door. It will be noticed, however, that the door cannot be closed until the bridging device 12 establishes circuit connection between contacts 6 and 7, that is, until the motorman has made the necessary actuation to propel the car forwardly in the manner stated above. The door switches 10, however, being in circuit with the usual accelerator (not shown), the accelerator receives no current from the source even though the bridging device 12 establishes circuit connection between contacts 6 and 7 until all of the door switches 10 are closed, and as the door switches 10 do not become closed until the doors themselves are completely closed even though the only means within the power of the motorman is actuated to normally cause the car to travel forwardly, the car cannot receive propelling power until all of the doors are closed. To prevent waste of the current through the closing magnet 15 the door or door actuating arm 43 of the motor 13 when reaching the limit of its movement engages the rod 40 and pushes bridging member 28 out of circuital contact with contacts 27 and 29 against the action of spring 43. It will be readily understood that when the opening magnet 14 is again energized so that the door recedes from its closed position the bridging member 28 will again be drawn by its spring 43 to establish circuit connection between contacts 27 and 29. The car now being in motion, it is apparent that even though contacts 16 and 17 are bridged by the reversing cylinder, current is supplied from the line 3, through contact 6, bridge 12, contact 7, line 8, line 5, through magnet valve 31 to ground, thus allowing fluid pressure from pipe line 30 to get behind the piston 50 and force the bridging member 23 out of circuital position relative to the contacts 21 and 22. Thus while the car is being propelled under its own power, even though the push button switch 20 is closed, the circuit of the opening magnet valve 14 is broken at the contacts 21 and 22. Likewise, due to the fact that from the line 8 current is being supplied through magnet 60 the circuit of the motor 56 is broken at contacts 57 and 58 to prevent short-circuiting the motor windings. Assume, however, that the car is coasting, that is, its third possible condition moving under its own momentum, but with power off, the motor 56 is not receiving power from the mains, but due to its movement is setting up a counter E. M. F., as is termed in the art, and as is well understood, from the motor 56 to contact 57, and as power is off, that is, bridging member 12 is out of circuital arrangement with contacts 6 and 7, and consequently magnet 60 is deenergized and the bridging member 59 establishes electrical connection by means of bridging member 59 between contacts 57, 58, line 61, to magnet valve 31, back to the opposite terminal of the motor, thus energizing magnet valve 31 and allowing fluid pressure to get behind the piston 50 to break the circuit between contacts 21 and 22, as above explained.

From the foregoing it will be seen that I have provided a simple and efficient arrangement for making a one man car absolutely safe so far as the door control mechanism is concerned. If desired, and as shown, means may be employed for eliminating pneumatic motor control of the doors in case of emergency, and for this purpose I have shown a three-way valve of the usual construction, illustrated at 70, for controlling the main bridge line 71 of fluid pressure to the motor 13, which valve may be operated in any desired manner, for example, by means of a cord 72 suitably located in the car at any convenient position to shut off the supply of fluid pressure to the motor 13 and exhaust the same to atmosphere.

Many modifications and changes in detail will readily occur to those skilled in the art without departing from the spirit and scope of my invention as defined in the claims; therefore what I claim as new and useful and of my own invention and desire to secure by Letters Patent, is,—

1. In an electrically controlled car, and in combination with a manually controlled power circuit and a fluid pressure actuated door operating motor, and electrically controlled devices for controlling the opening and closing movements of said motor, of circuits for controlling said devices, and means for closing the circuit of said door closing device when said power circuit is closed.

2. In an electrically controlled car, and in combination with a manually controlled power circuit and a fluid pressure actuated door operating motor, and electrically controlled devices for controlling the opening and closing movements of said motor, of circuits for controlling said devices, and means for closing the circuit of said door closing device when said power circuit is closed, and means for opening the circuit of said door closing device when said motor reaches the limit of its closing movement.

3. In an electrically controlled car, and in combination with a manually controlled power circuit and a fluid pressure actuated door operating motor, and electrically controlled devices for controlling the opening and closing movements of said motor, of circuits for controlling said devices, and electromagnetic means for maintaining the circuit of said door opening device open when said power circuit is closed.

4. In an electrically controlled car, and in combination with a manually controlled power circuit and a fluid pressure actuated door operating motor, and electrically controlled devices for controlling the opening and closing movements of said motor, of circuits for controlling said devices, and electro-magnetic means for maintaining the circuit of said door opening device open when the car is in motion.

5. In an electrically controlled car, and in combination with a manually controlled power circuit and a fluid pressure actuated door operating motor, and electrically controlled devices for controlling the opening and closing movements of said motor, of circuits for controlling said devices, and electro-magnetic means for maintaining the circuit of said door opening device open when said power circuit is closed or when the car is in motion.

6. In an electrically driven car, and in combination with a reversing cylinder, of a power circuit controlled thereby, a manually operated switch and a door operated switch for also controlling said circuit, a fluid pressure door operating motor, an electrical device for controlling the closing movements of said motor, and a circuit for controlling said device, and means whereby when said manually operated switch is closed the circuit of said device is completed to actuate said motor to close the car doors and to open said door operated switch.

7. In an electrically driven car, the combination of a reversing cylinder and a power circuit controlled thereby, a manually operated switch associated with said cylinder and door switches for also controlling said circuit, a fluid pressure door operating motor, an electrical device for controlling the closing movements of said motor, and a circuit for controlling said device, and means whereby when said manually operated switch is closed the circuit of said device is completed to actuate said motor to close the car doors and said door switches, and means for opening the circuit of said device when the motor completes its closing movement.

8. In an electrically operated car, the combination with a door operating motor, of electrical means for controlling the opening movements of said motor, a circuit for controlling said electrical means, a normally open manually operated switch for controlling said circuit, an automatically operated switch also controlling said circuit, a power circuit, and means for operating said automatic switch to open and maintain the same open when current is flowing through said power circuit.

9. In an electrically operated car, the combination with a door operating motor, of electrical means for controlling the opening movements of said motor, a circuit for controlling said electrical means, a normally open manually operated switch for controlling said circuit, an electro-magnetically operated switch also controlling said circuit, and means for operating said switch to open and maintain the same open when the car is in motion.

10. In an electrically operated car, the combination with a door operating motor, of electrical means for controlling the opening movements of said motor, a circuit for controlling said electrical means, a normally open manually operated switch for controlling said circuit, an automatically operated switch also controlling said circuit, a power circuit, and means for operating said automatic switch to open and maintain the same open when current is flowing through said power circuit or when the car is in motion.

11. In an electrically operated car, the combination with a door operating motor, of electrical means for controlling the opening movements of said motor, a circuit for controlling said electrical means, a normally open manually operated switch for controlling said circuit, a fluid pressure actuated switch also controlling said circuit, an electrically operated valve for controlling the fluid pressure to said fluid pressure actuated switch, whereby when said valve is energized said switch is open, a power circuit, and means for energizing said valve when said power circuit is closed.

12. In an electrically operated car, the combination with a door operating motor, of electrical means for controlling the opening movements of said motor, a circuit for controlling said electrical means, a normally open manually operated switch for controlling said circuit, a fluid pressure actuated switch also controlling said circuit, an electrically operated valve for controlling the fluid pressure to said fluid pressure actuated switch, whereby when said valve is energized said switch is open, and means for energizing said valve when the car is in motion.

13. In an electrically operated car, the combination with a door operating motor, of electrical means for controlling the opening movements of said motor, a circuit for controlling said electrical means, a normally open manually operated switch for controlling said circuit, a fluid pressure actuated switch also controlling said circuit, an electrically operated valve for controlling the fluid pressure to said fluid pressure actuated switch, whereby when said valve is energized said switch is open, a power circuit, and means for energizing said valve when said power circuit is closed, or when said car is in motion.

14. In an electrically operated car, the combination with a door operating motor, of electrical means for controlling the opening movements of said motor, a circuit for controlling said electrical means, a normally open manually operated switch for controlling said circuit, a fluid pressure actuated switch also controlling said circuit, an electrically operated valve for controlling the fluid pressure to said fluid pressure actuated switch whereby when said valve is energized said switch is open, a power circuit controlling said valve, an auxiliary circuit for said valve including the car motor, and means for maintaining said auxiliary circuit open when current is flowing through the power circuit.

15. In an electrically operated car, the combination with a door operating motor, of electrical means for controlling the opening movements of said motor, a circuit for controlling said electrical means, a normally open manually operated switch for controlling said circuit, a fluid pressure actuated switch also controlling said circuit, an electrically operated valve for controlling the fluid pressure to said fluid pressure actuated switch, whereby when said valve is energized said switch is open, a power circuit controlling said valve, an auxiliary circuit for said valve including the car motor, and means for maintaining said auxiliary circuit closed when no current is flowing through said power circuit.

In testimony whereof I have hereunto set my hand on this 13th day of April A. D. 1920.

JOHN S. McWHIRTER.